US012757063B2

(12) United States Patent
Park et al.

(10) Patent No.: US 12,757,063 B2
(45) Date of Patent: Oct. 6, 2026

(54) APPARATUS, SYSTEM, AND METHOD OF MULTI-LINK TRAFFIC INDICATION MAP (TIM)

(71) Applicant: Intel Corporation, Santa Clara, CA (US)

(72) Inventors: Minyoung Park, San Ramon, CA (US); Laurent Cariou, Milizac (FR)

(73) Assignee: Intel Corporation, Santa Clara, CA (US)

( * ) Notice: Subject to any disclaimer, the term of this patent is extended or adjusted under 35 U.S.C. 154(b) by 324 days.

(21) Appl. No.: 18/252,038

(22) PCT Filed: Dec. 6, 2021

(86) PCT No.: PCT/US2021/061965
§ 371 (c)(1),
(2) Date: May 7, 2023

(87) PCT Pub. No.: WO2022/125421
PCT Pub. Date: Jun. 16, 2022

(65) Prior Publication Data

US 2024/0015564 A1 Jan. 11, 2024

Related U.S. Application Data

(60) Provisional application No. 63/122,392, filed on Dec. 7, 2020.

(51) Int. Cl.

| | |
|---|---|
| ***H04W 28/02*** | (2009.01) |
| ***H04W 28/12*** | (2009.01) |
| ***H04W 28/14*** | (2009.01) |

(52) U.S. Cl.
CPC ... *H04W 28/0263* (2013.01); *H04W 28/0247* (2013.01); *H04W 28/0278* (2013.01); *H04W 28/12* (2013.01); *H04W 28/14* (2013.01)

(58) Field of Classification Search
CPC ......... H04W 28/0263; H04W 28/0278; H04W 28/0247; H04W 28/12; H04W 84/12; H04W 88/10; H04W 28/14; Y02D 30/70
See application file for complete search history.

(56) References Cited

U.S. PATENT DOCUMENTS

2006/0056443 A1 3/2006 Tao et al.
2015/0063232 A1 3/2015 Choi et al.
(Continued)

FOREIGN PATENT DOCUMENTS

CN 107771401 3/2018
CN 111527766 8/2020

OTHER PUBLICATIONS

International Preliminary Report on Patentability for International Application No. PCT/US2021/061965, mailed on Jun. 22, 2023, 7 pages.
(Continued)

*Primary Examiner* — Omer S Mian
(74) *Attorney, Agent, or Firm* — Shichrur & Co.

(57) ABSTRACT

For example, a beacon, e.g., which may be communicated from an Access point (AP) Multi-Link Device (MLD) to a non-AP MLD, may be configured according to a multi-link Traffic Indication Map (TIM) mechanism. For example, the beacon may include a TIM bitmap including a bit set to “1” to indicate buffered traffic for the non-AP MLD. For example, the beacon may include a link bitmap corresponding to the non-AP MLD. For example, the link bitmap corresponding to the non-AP MLD may include a plurality of bits corresponding to a respective plurality of links for the non-AP MLD. For example, a bit in the link bitmap may be set to “1” to indicate a link for retrieving one or more buffered Bufferable Units (BUs) for the non-AP MLD.

16 Claims, 8 Drawing Sheets

(56) References Cited

U.S. PATENT DOCUMENTS

| | | | | |
|---|---|---|---|---|
| 2019/0261402 | A1 | 8/2019 | Asterjadhi et al. | |
| 2020/0137626 | A1 | 4/2020 | Huang et al. | |
| 2023/0232276 | A1* | 7/2023 | Chitrakar | H04W 28/0278 |
| 2023/0319927 | A1* | 10/2023 | Kwon | H04W 72/23 370/338 |

OTHER PUBLICATIONS

IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications, IEEE Computer Society, IEEE Std 802.11™-2020 (Revision of IEEE Std 802.11-2016), Approved Dec. 3, 2020, 4379 pages.

International Search Report and the Written Opinion for International Application No. PCT/US2021/061965, mailed on Apr. 15, 2022, 10 pages.

Young Hoon Kwon et al., NXP, Multi-Link TIM, IEEE 802.11-20/0066r3, May 21, 2020, 17 pages.

Edward Au, Huawei, Specification framework for TGbe, IEEE 802.11-19/1262r21, Dec. 3, 2020, 103 pages.

Minyoung Park et al., INTEL, Multi-link TIM—follow up, IEEE 802.11-20/0084r1, Apr. 21, 2020, 10 pages.

Office Action for Chinese Patent Application No. 202180074937.1, mailed on Aug. 8, 2026, 9 pages.

* cited by examiner

300

APPARATUS, SYSTEM, AND METHOD OF MULTI-LINK TRAFFIC INDICATION MAP (TIM)

CROSS REFERENCE

This application claims the benefit of and priority from U.S. Provisional Patent Application No. 63/122,392 entitled "Multi-Link Traffic Indication Map (TIM) Design and Operation", filed Dec. 7, 2020, the entire disclosure of which is incorporated herein by reference.

TECHNICAL FIELD

Aspects described herein generally relate to wireless communication utilizing a multi-link Traffic Indication Map (TIM) mechanism.

BACKGROUND

Devices in a wireless communication system may be configured to communicate according to communication protocols, which may utilize a Traffic Indication Map (TIM) mechanism. The TIM mechanism may be configured to utilize a bitmap, which may be transmitted by ab Access Point (AP) to indicate to non-AP stations that the AP has buffered data waiting for them.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
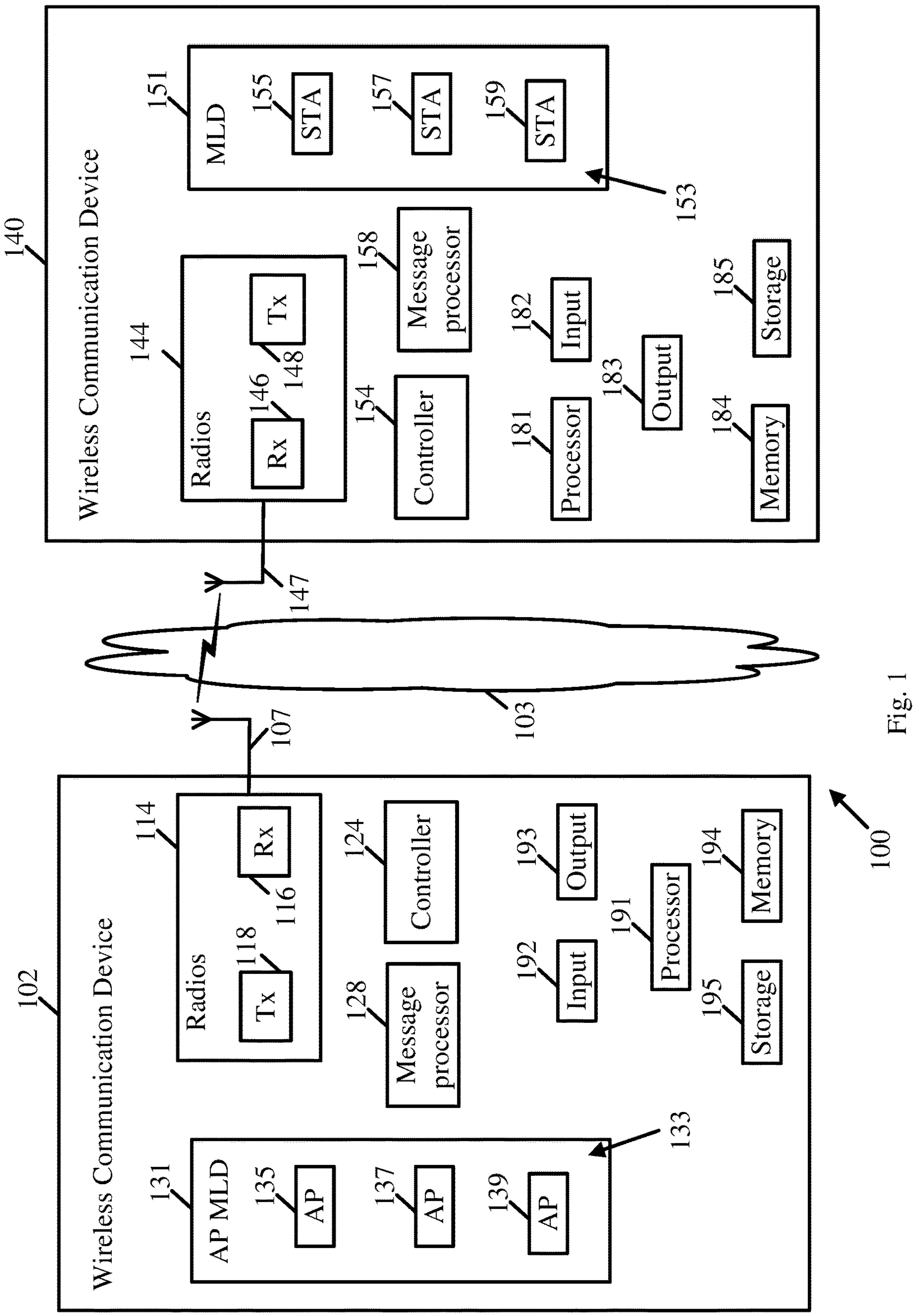
FIG. 1 is a schematic block diagram illustration of a system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing IEEE 802.11 standards (including IEEE 802.11-2020 (*IEEE* 802.11-2020*, IEEE Standard for Information Technology—Telecommunications and Information Exchange between Systems Local and Metropolitan Area Networks—Specific Requirements; Part* 11*: Wireless LAN Medium Access Control* (*MAC*) *and Physical Layer* (*PHY*) *Specifications, December,* 2020); and/or IEEE 802.11be (*IEEE P*802.11*be/D*1.2 *Draft Standard for Information technology—Telecommunications and information exchange between systems Local and metropolitan area networks—Specific requirements; Part* 11*: Wireless LAN Medium Access Control* (*MAC*) *and Physical Layer* (*PHY*) *Specifications; Amendment* 8: *Enhancements for extremely high throughput* (*EHT*),

*September* 2021)) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some aspects may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™ Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that may be integrated with a computer, or a peripheral that may be attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated or group), and/or memory (shared. Dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a sub-10 Gigahertz (GHz) frequency band, for example, a 2.4 GHz frequency band, a 5 GHz frequency band, a 6 GHz frequency band, and/or any other frequency below 10 GHz.

Some demonstrative aspects may be used in conjunction with a wireless communication network communicating over an Extremely High Frequency (EHF) band (also referred to as the "millimeter wave (mmWave)" frequency band), for example, a frequency band within the frequency band of between 20 Ghz and 300 GHz, for example, a frequency band above 45 GHz, e.g., a 60 GHz frequency band, and/or any other mmWave frequency band.

Some demonstrative aspects may be used in conjunction with a wireless communication network communicating over the sub-10 GHz frequency band and/or the mmWave frequency band, e.g., as described below. However, other aspects may be implemented utilizing any other suitable wireless communication frequency bands, for example, a 5G frequency band, a frequency band below 20 GHz, a Sub 1 GHz (S1G) band, a WLAN frequency band, a WPAN frequency band, and the like.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Reference is made to FIG. 1, which schematically illustrates a system 100, in accordance with some demonstrative aspects.

As shown in FIG. 1, in some demonstrative aspects, system 100 may include one or more wireless communication devices. For example, system 100 may include a wireless communication device 102, a wireless communication device 140, and/or one or more other devices.

In some demonstrative aspects, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative aspects, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative aspects, some or all of the components of one or more of devices 102 and/or 140 may be enclosed in a common housing or packaging, and may be interconnected or operably associated using one or more wired or wireless links. In other aspects, components of one or more of devices 102 and/or 140 may be distributed among multiple or separate devices.

In some demonstrative aspects, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative aspects, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative aspects, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative aspects, wireless communication devices 102 and/or 140 may be capable of communicating content, data, information and/or signals via a wireless medium (WM) 103. In some demonstrative aspects, wireless medium 103 may include, for example, a radio channel, an RF channel, a WiFi channel, a cellular channel, a 5G channel, an IR channel, a Bluetooth (BT) channel, a Global Navigation Satellite System (GNSS) Channel, and the like.

In some demonstrative aspects, WM 103 may include one or more wireless communication frequency bands and/or channels. For example, WM 103 may include one or more channels in a sub-10 Ghz wireless communication frequency band, for example, a 2.4 GHz wireless communication frequency band, one or more channels in a 5 GHz wireless communication frequency band, and/or one or more channels in a 6 GHz wireless communication frequency band. In another example, WM 103 may additionally or alternative include one or more channels in a mmWave wireless communication frequency band.

In other aspects, WM 103 may include any other type of channel over any other frequency band.

In some demonstrative aspects, device 102 and/or device 140 may include one or more radios including circuitry and/or logic to perform wireless communication between devices 102, 140 and/or one or more other wireless communication devices. For example, device 102 may include one or more radios 114, and/or device 140 may include one or more radios 144.

In some demonstrative aspects, radios 114 and/or 144 may include one or more wireless receivers (Rx) including circuitry and/or logic to receive wireless communication signals, RF signals, frames, blocks, transmission streams, packets, messages, data items, and/or data. For example, a radio 114 may include at least one receiver 116, and/or a radio 144 may include at least one receiver 146.

In some demonstrative aspects, radios 114 and/or 144 may include one or more wireless transmitters (Tx) including circuitry and/or logic to transmit wireless communication signals, RF signals, frames, blocks, transmission streams, packets, messages, data items, and/or data. For example, a radio 114 may include at least one transmitter 118, and/or a radio 144 may include at least one transmitter 148.

In some demonstrative aspects, radios 114 and/or 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radios 114 and/or 144 may include or may be implemented as part of a wireless Network Interface Card (NIC), and the like.

In some demonstrative aspects, radios 114 and/or 144 may be configured to communicate over a 2.4 GHz band, a 5 GHz band, a 6 GHz band, and/or any other band, for example, a directional band, e.g., an mmWave band, a 5G band, an S1G band, and/or any other band.

In some demonstrative aspects, radios 114 and/or 144 may include, or may be associated with one or more, e.g., a plurality of, antennas.

In some demonstrative aspects, device 102 may include one or more, e.g., a plurality of, antennas 107, and/or device 140 may include on or more, e.g., a plurality of, antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. In some aspects, antennas 107 and/or 147 may implement transmit and receive functionalities using separate transmit and receive antenna elements. In some aspects, antennas 107 and/or 147 may implement transmit and receive functionalities using common and/or integrated transmit/receive elements.

In some demonstrative aspects, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative aspects, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, at least part of the functionality of controller 124 may be implemented as part of one or more elements of radio 114, and/or at least part of the functionality of controller 154 may be implemented as part of one or more elements of radio 144.

In other aspects, the functionality of controller 124 may be implemented as part of any other element of device 102, and/or the functionality of controller 154 may be implemented as part of any other element of device 140.

In some demonstrative aspects, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative aspects, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, an MPDU; at least one second component configured to convert the message into a PPDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 158 may be configured to perform any other additional or alternative functionality and/or may include any other additional or alternative components to generate and/or process a message to be transmitted.

In some demonstrative aspects, message processors 128 and/or 158 may include, or may be implemented, partially or entirely, by circuitry and/or logic, e.g., one or more processors including circuitry and/or logic, memory circuitry and/or logic, MAC circuitry and/or logic, PHY circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative aspects, at least part of the functionality of message processor 128 may be implemented as part of radio 114, and/or at least part of the functionality of message processor 158 may be implemented as part of radio 144.

In some demonstrative aspects, at least part of the functionality of message processor 128 may be implemented as part of controller 124, and/or at least part of the functionality of message processor 158 may be implemented as part of controller 154.

In other aspects, the functionality of message processor 128 may be implemented as part of any other element of device 102, and/or the functionality of message processor 158 may be implemented as part of any other element of device 140.

In some demonstrative aspects, at least part of the functionality of controller 124 and/or message processor 128 may be implemented by an integrated circuit, for example, a chip, e.g., a System on Chip (SoC). In one example, the chip or SoC may be configured to perform one or more functionalities of one or more radios 114. For example, the chip or SoC may include one or more elements of controller 124, one or more elements of message processor 128, and/or one or more elements of one or more radios 114. In one example, controller 124, message processor 128, and one or more radios 114 may be implemented as part of the chip or SoC.

In other aspects, controller 124, message processor 128 and/or the one or more radios 114 may be implemented by one or more additional or alternative elements of device 102.

In some demonstrative aspects, at least part of the functionality of controller 154 and/or message processor 158 may be implemented by an integrated circuit, for example, a chip, e.g., a SoC. In one example, the chip or SoC may be configured to perform one or more functionalities of one or more radios 144. For example, the chip or SoC may include one or more elements of controller 154, one or more elements of message processor 158, and/or one or more elements of one or more radios 144. In one example, controller 154, message processor 158, and one or more radios 144 may be implemented as part of the chip or SoC.

In other aspects, controller 154, message processor 158 and/or one or more radios 144 may be implemented by one or more additional or alternative elements of device 140.

In some demonstrative aspects, device 102 and/or device 140 may include, operate as, perform the role of, and/or perform one or more functionalities of, one or more STAs. For example, device 102 may include at least one STA, and/or device 140 may include at least one STA.

In some demonstrative aspects, device 102 and/or device 140 may include, operate as, perform the role of, and/or perform one or more functionalities of, one or more Extremely High Throughput (EHT) STAs. For example, device 102 may include, operate as, perform the role of, and/or perform one or more functionalities of, one or more EHT STAs, and/or device 140 may include, operate as, perform the role of, and/or perform one or more functionalities of, one or more EHT STAs.

In other aspects, devices 102 and/or 140 may include, operate as, perform the role of, and/or perform one or more functionalities of, any other wireless device and/or station, e.g., a WLAN STA, a WiFi STA, and the like.

In some demonstrative aspects, device 102 and/or device 140 may be configured to operate as, perform the role of, and/or perform one or more functionalities of, an access point (AP), e.g., an EHT AP STA.

In some demonstrative aspects, device 102 and/or device 140 may be configured to operate as, perform the role of, and/or perform one or more functionalities of, a non-AP STA, e.g., an EHT non-AP STA.

In other aspects, device 102 and/or device 140 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains one station (STA) and provides access to the distribution services, via the wireless medium (WM) for associated STAs. An AP may include a STA and a distribution system access function (DSAF). The AP may perform any other additional or alternative functionality.

In some demonstrative aspects devices 102 and/or 140 may be configured to communicate in an EHT network, and/or any other network.

In some demonstrative aspects, devices 102 and/or 140 may be configured to operate in accordance with one or more Specifications, for example, including one or more *IEEE* 802.11 *Specifications*, e.g., an *IEEE* 802.11-2020 *Specification, an IEEE* 802.11*be Specification*, and/or any other specification and/or protocol.

In some demonstrative aspects, device 102 and/or device 140 may include, operate as, perform a role of, and/or perform the functionality of, one or more multi-link logical entities, e.g., as described below.

In other aspect, device 102 and/or device 140 may include, operate as, perform a role of, and/or perform the functionality of, any other entities, e.g., which are not multi-link logical entities.

For example, a multi-link logical entity may include a logical entity that contains one or more STAs. The logical entity may have one MAC data service interface and primitives to the logical link control (LLC) and a single address associated with the interface, which can be used to communicate on a distribution system medium (DSM). For example, the DSM may include a medium or set of media used by a distribution system (DS) for communications between APs, mesh gates, and the portal of an extended service set (ESS). For example, the DS may include a system used to interconnect a set of basic service sets (BSSs) and integrated local area networks (LANs) to create an extended service set (ESS). In one example, a multi-link logical entity may allow STAs within the multi-link logical entity to have the same MAC address. The multi-link entity may perform any other additional or alternative functionality.

In some demonstrative aspects, device 102 and/or device 140 may include, operate as, perform a role of, and/or perform the functionality of, a Multi-Link Device (MLD). For example, device 102 may include, operate as, perform a role of, and/or perform the functionality of, at least one MLD, and/or device 140 may include, operate as, perform a role of, and/or perform the functionality of, at least one MLD, e.g., as described below.

For example, an MLD may include a device that is a logical entity and has more than one affiliated STA and has a single MAC service access point (SAP) to LLC, which includes one MAC data service. The MLD may perform any other additional or alternative functionality.

In some demonstrative aspects, for example, an infrastructure framework may include a multi-link AP logical entity, which includes APs, e.g., on one side, and a multi-link non-AP logical entity, which includes non-APs, e.g., on the other side.

In some demonstrative aspects, device 102 and/or device 140 may be configured to operate as, perform the role of, and/or perform one or more functionalities of, an AP MLD.

In some demonstrative aspects, device 102 and/or device 140 may be configured to operate as, perform the role of, and/or perform one or more functionalities of, a non-AP MLD.

In other aspects, device 102 and/or device 140 may operate as, perform the role of, and/or perform one or more functionalities of, any other additional or alternative device and/or station.

For example, an AP MLD may include an MLD, where each STA affiliated with the MLD is an AP. In one example, the AP MLD may include a multi-link logical entity, where each STA within the multi-link logical entity is an EHT AP. The AP MLD may perform any other additional or alternative functionality.

For example, a non-AP MLD may include an MLD, where each STA affiliated with the MLD is a non-AP STA. In one example, the non-AP MLD may include a multi-link logical entity, where each STA within the multi-link logical entity is a non-AP EHT STA. The non-AP MLD may perform any other additional or alternative functionality.

In one example, a multi-link infrastructure framework may be configured as an extension from a one link operation between two STAs, e.g., an AP and a non-AP STA.

In some demonstrative aspects, controller 124 may be configured to control, perform and/or to trigger, cause, instruct and/or control device 102 to operate as, perform a role of, and/or perform one or more operations and/or functionalities of, an AP MLD 131 including a plurality of AP STAs 133, e.g., including an AP STA 135, an AP STA 137 and/or an AP STA 139. In some aspects, as shown in FIG. 1, AP MLD 131 may include three AP STAs. In other aspects, AP MLD 131 may include any other number of AP STAs.

In one example, AP STA 135, AP STA 137 and/or AP STA 139 may operate as, perform a role of, and/or perform one or more operations and/or functionalities of, an EHT AP STA. In other aspects, AP STA 135, AP STA 137 and/or AP STA 139 may perform any other additional or alternative functionality.

In some demonstrative aspects, for example, the one or more radios 114 may include, for example, a radio for communication by AP STA 135 over a first wireless communication frequency channel and/or frequency band, e.g., a 2.4 Ghz band, as described below.

In some demonstrative aspects, for example, the one or more radios 114 may include, for example, a radio for communication by AP STA 137 over a second wireless communication frequency channel and/or frequency band, e.g., a 5 Ghz band, as described below.

In some demonstrative aspects, for example, the one or more radios 114 may include, for example, a radio for communication by AP STA 139 over a third wireless communication frequency channel and/or frequency band, e.g., a 6 Ghz band, as described below.

In some demonstrative aspects, the radios 114 utilized by APs 133 may be implemented as separate radios. In other aspects, the radios 114 utilized by APs 133 may be implemented by one or more shared and/or common radios and/or radio components.

In other aspects controller 124 may be configured to control, perform and/or to trigger, cause, instruct and/or control device 102 to operate as, perform a role of, and/or perform one or more operations and/or functionalities of, any other additional or alternative entity and/or STA, e.g., a single STA, multiple STAs, and/or a non-MLD entity.

In some demonstrative aspects, controller 154 may be configured to control, perform and/or to trigger, cause, instruct and/or control device 140 to operate as, perform a role of, and/or perform one or more operations and/or functionalities of, an MLD 151 including a plurality of STAs 153, e.g., including a STA 155, a STA 157 and/or a STA 159.

In some aspects, as shown in FIG. 1, MLD 151 may include three STAs. In other aspects, MLD 151 may include any other number of STAs.

In one example, STA 155, STA 157 and/or STA 159 may operate as, perform a role of, and/or perform one or more operations and/or functionalities of, an EHT STA.

In other aspects, STA 155, STA 157 and/or STA 159 may perform any other additional or alternative functionality.

In some demonstrative aspects, for example, the one or more radios 144 may include, for example, a radio for communication by STA 155 over a first wireless communication frequency channel and/or frequency band, e.g., a 2.4 Ghz band, as described below.

In some demonstrative aspects, for example, the one or more radios 144 may include, for example, a radio for communication by STA 157 over a second wireless communication frequency channel and/or frequency band, e.g., a 5 Ghz band, as described below.

In some demonstrative aspects, for example, the one or more radios 144 may include, for example, a radio for communication by STA 159 over a third wireless communication frequency channel and/or frequency band, e.g., a 6 Ghz band, as described below.

In some demonstrative aspects, the radios 144 utilized by STAs 153 may be implemented as separate radios. In other aspects, the radios 144 utilized by STAs 153 may be implemented by one or more shared and/or common radios and/or radio components.

In some demonstrative aspects, controller 154 may be configured to control, perform and/or to trigger, cause, instruct and/or control MLD 151 to operate as, perform a role of, and/or perform one or more operations and/or functionalities of, a non-AP MLD. For example, STA 155, STA 157 and/or STA 159 may operate as, perform a role of, and/or perform one or more operations and/or functionalities of, a non-AP EHT STA.

In some demonstrative aspects, controller 154 may be configured to control, perform and/or to trigger, cause, instruct and/or control MLD 151 to operate as, perform a role of, and/or perform one or more operations and/or functionalities of, an AP MLD.

For example, STA 155, STA 157 and/or STA 159 may operate as, perform a role of, and/or perform one or more operations and/or functionalities of, an AP EHT STA.

In other aspects controller 154 may be configured to control, perform and/or to trigger, cause, instruct and/or control device 140 to operate as, perform a role of, and/or perform one or more operations and/or functionalities of, any other additional or alternative entity and/or STA, e.g., a single STA, multiple STAs, and/or a non-MLD entity.

Figure 2:
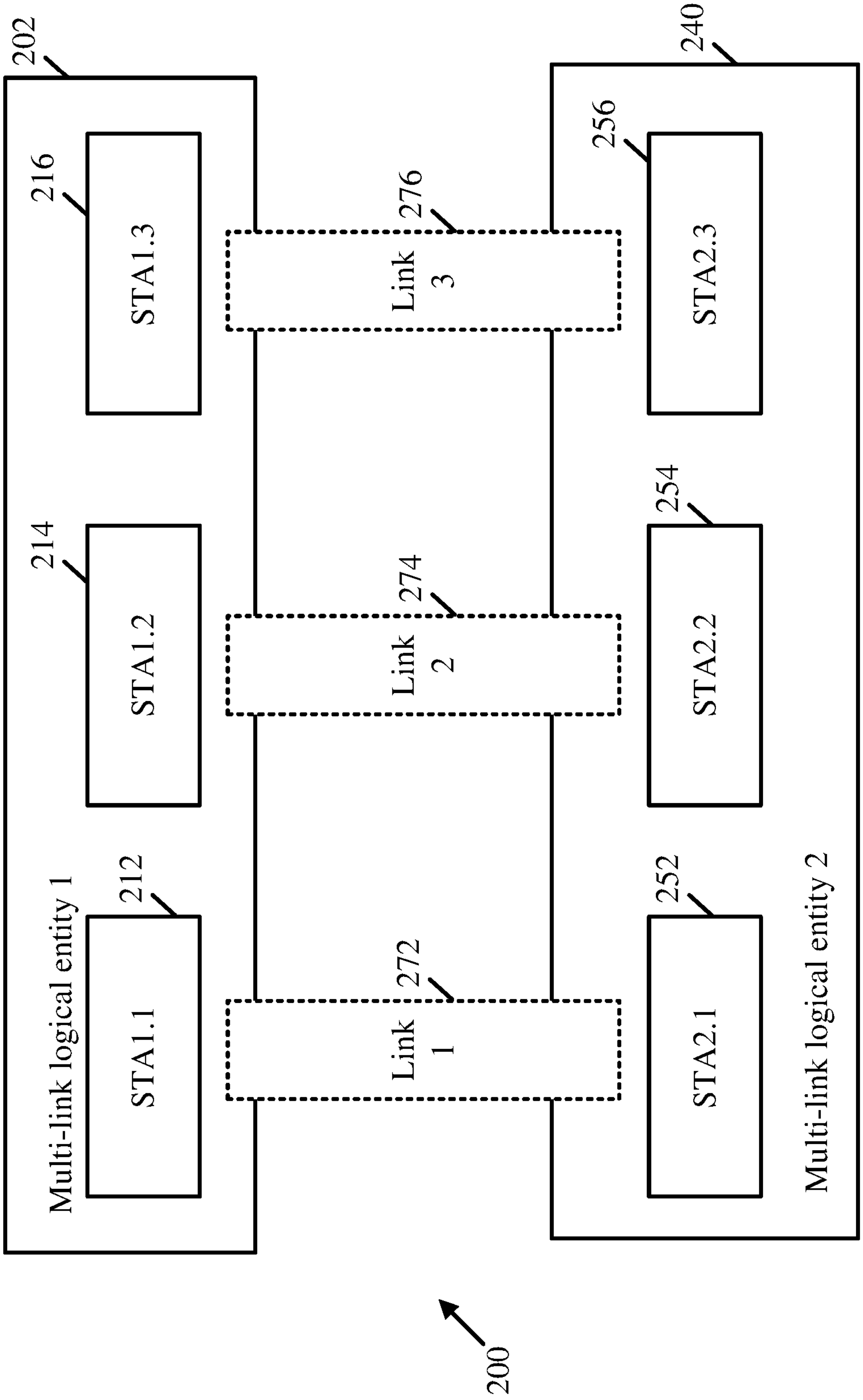
FIG. 2 is a schematic illustration of a multi-link communication scheme, which may be implemented in accordance with some demonstrative aspects.

Reference is made to FIG. 2, which schematically illustrates a multi-link communication scheme 200, which may be implemented in accordance with some demonstrative aspects.

As shown in FIG. 2, a first multi-link logical entity 202 ("multi-link logical entity 1"), e.g., a first MLD, may include a plurality of STAs, e.g., including a STA 212, a STA 214, and a STA 216. In one example, AP MLD 131 (FIG. 1) may perform one or more operations, one or more functionalities, the role of, and/or the functionality of, multi-link logical entity 202.

As shown in FIG. 2, a second multi-link logical entity 240 ("multi-link logical entity 2"), e.g., a second MLD, may include a plurality of STAs, e.g., including a STA 252, a STA 254, and a STA 256. In one example, MLD 151 (FIG. 1) may perform one or more operations, one or more functionalities, the role of, and/or the functionality of, multi-link logical entity 240.

As shown in FIG. 2, multi-link logical entity 202 and multi-link logical entity 240 may be configured to form, setup and/or communicate over a plurality of links, for example, including a link 272 between STA 212 and STA 252, a link 274 between STA 214 and STA 254, and/or a link 276 between STA 216 and STA 256.

Figure 3:
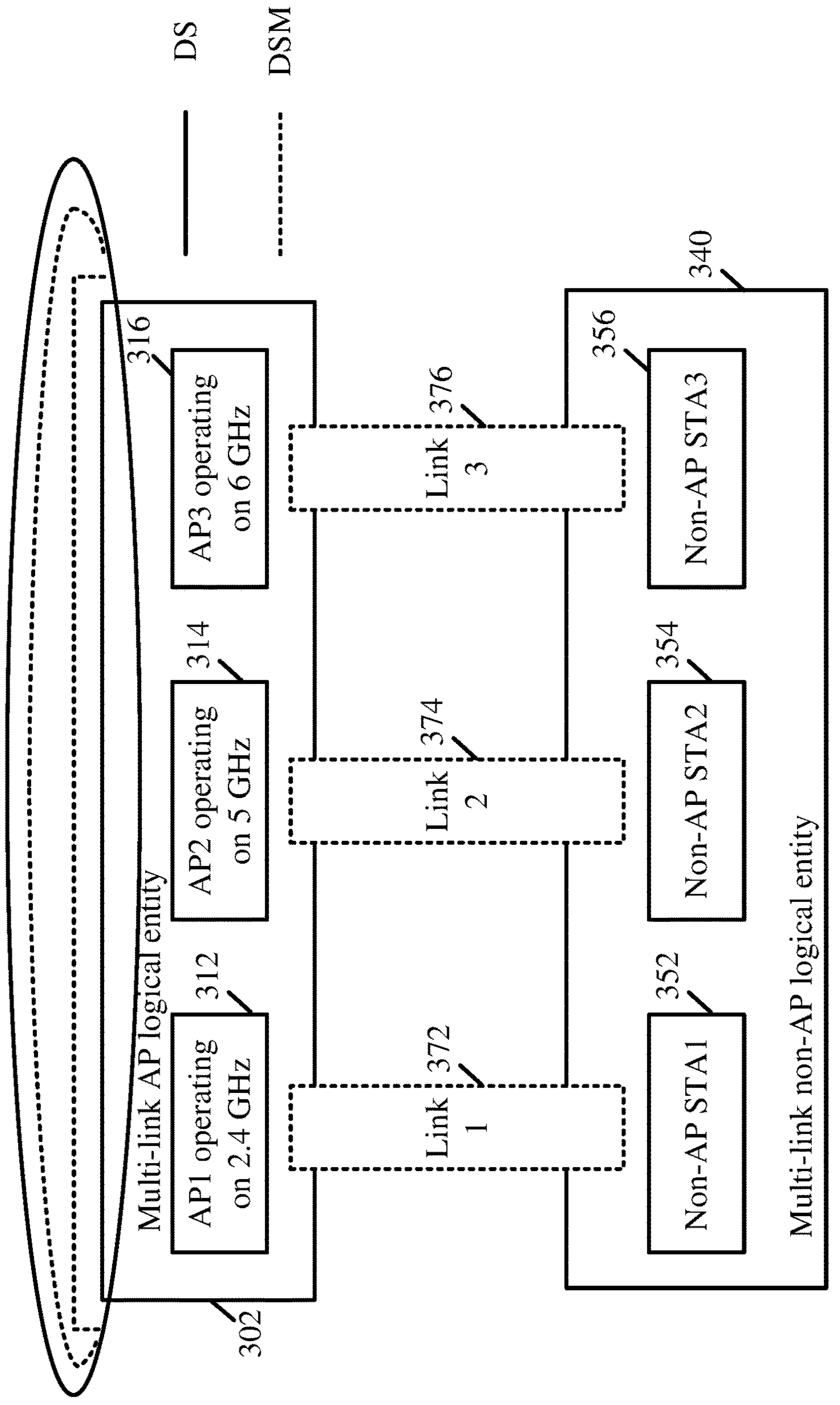
FIG. 3 is a schematic illustration of a multi-link communication scheme, which may be implemented in accordance with some demonstrative aspects.

Reference is made to FIG. 3, which schematically illustrates a multi-link communication scheme 300, which may be implemented in accordance with some demonstrative aspects.

As shown in FIG. 3, a multi-link AP logical entity 302, e.g., an AP MLD, may include a plurality of AP STAs, e.g., including an AP STA 312, an AP STA 314, and an AP STA 316. In one example, AP MLD 131 (FIG. 1) may perform one or more operations, one or more functionalities, the role of, and/or the functionality of, multi-link AP logical entity 302.

As shown in FIG. 3, a multi-link non-AP logical entity 340, e.g., a non-AP MLD, may include a plurality of non-AP STAs, e.g., including a non-AP STA 352, a non-AP STA 354, and a non-AP STA 356. In one example, MLD 151 (FIG. 1) may perform one or more operations, one or more functionalities, the role of, and/or the functionality of, multi-link non-AP logical entity 340.

As shown in FIG. 3, multi-link AP logical entity 302 and multi-link non-AP logical entity 340 may be configured to form, setup and/or communicate over a plurality of links, for example, including a link 372 between AP STA 312 and non-AP STA 352, a link 374 between AP STA 314 and non-AP STA 354, and/or a link 376 between AP STA 316 and non-AP STA 356.

For example, as shown in FIG. 3, multi-link AP logical entity 302 may include a multi-band AP MLD, which may be configured to communicate over a plurality of wireless communication frequency bands. For example, as shown in FIG. 3, AP STA 312 may be configured to communicate over a 2.4 Ghz frequency band, AP STA 314 may be configured to communicate over a 5 Ghz frequency band, and/or AP STA 316 may be configured to communicate over a 6 Ghz frequency band. In other aspects, AP STA 312, AP STA 314, and/or AP STA 316, may be configured to communicate over any other additional or alternative wireless communication frequency bands.

Referring back to FIG. 1, in some demonstrative aspects, devices 102 and/or 140 may be configured to communicate according to a Traffic Indication Map (TIM) mechanism, e.g., as described below.

In some demonstrative aspects, devices 102 and/or 140 may be configured to support a technical solution to communicate multi-link communications, e.g., between AP MLD 131 and MLD 151 according to a multi-link TIM mechanism, e.g., as described below.

In some demonstrative aspects, the multi-link TIM mechanism may be configured to provide a technical solution to support one or more types of multi-link configurations, e.g., as described below.

In some demonstrative aspects, the multi-link TIM mechanism may be configured to provide a technical solution to support one or more different Traffic Identifier (TID) to link (TID-to-link) configurations, e.g., as described below.

In some demonstrative aspects, the multi-link TIM mechanism may be configured to provide a technical solution to support a default TID-to-link configuration, e.g., as described below.

In some demonstrative aspects, the multi-link TIM mechanism may be configured to provide a technical solution to support a disjoint TID-to-link configuration, e.g., as described below.

In some demonstrative aspects, the multi-link TIM mechanism may be configured to provide a technical solution to support an overlapping TID-to-link configuration, e.g., as described below.

In some demonstrative aspects, the multi-link TIM mechanism may be configured to provide a technical solution to support one or more other additional or alternative TID-to-link configurations.

For example, a TID-to-link mapping may be defined in accordance with an *IEEE* 802.11*be Specification*, e.g., as described below. In other aspects, any other additional or alternative TID-to-link mapping may be implemented.

For example, a directional-based TID-to-link mapping mechanism may be defined among setup links of an MLD, e.g., in accordance with the *IEEE* 802.11*be Specification*, e.g., as follows:

By default, after the multi-link setup, all TIDs are mapped to all setup links.

The multi-link setup may include the TID-to-link mapping negotiation.

TID-to-link mapping can have the same or different link-set for each TID unless a non-AP MLD indicates that it requires to use the same link-set for all TIDs during the multi-link setup phase. Such indication method by the non-AP MLD may be implicit or explicit.

The TID-to-link mapping can be updated after multi-link setup through a negotiation, which can be initiated by any MLD. When the responding MLD cannot accept the update, it can reject the TID-to-link mapping update.

In one example, a default TID-to-link mapping may include all TIDs mapped to all links. For example, in an implementation of a plurality of TIDs, e.g., TIDs 0-7, and a first link (link 1) and a second link (link 2), the default TID-to-link mapping may include mapping TIDs 0-7 to link 1 and to link 2.

In another example, a disjoint TID-to-link mapping may include two sets of TIDs mapped to two different links, e.g., without overlap. For example, in an implementation of a plurality of TIDs, e.g., TIDs 0-7, and a first link (link 1) and a second link (link 2), the disjoint TID-to-link mapping may include mapping of only a first subset of the TIDs to link 1, for example, mapping TIDs 0-3 to link 1, e.g., while TIDs 4-7 may not be mapped to link 1; and mapping of only a second subset of the TIDs to link 2, for example, mapping TIDs 4-7 to link 2, e.g., while TIDs 0-3 may not be mapped to link 2.

In another example, an overlapping TID-to-link mapping may include one set of TIDs mapped to all links, and an other set of TIDs mapped to a subset of the links. For example, in an implementation of a plurality of TIDs, e.g., TIDs 0-7, and a first link (link 1) and a second link (link 2), the overlapping TID-to-link mapping may include mapping of a first subset of the TIDs to link 1 and to link 2, for example, mapping TIDs 4-7 to link 1 and to link 2; and mapping of only a second subset of the TIDs to only link 1, for example, mapping TIDs 0-3 to link 1, e.g., while TIDs 0-3 may not be mapped to link 2.

In some demonstrative aspects, a TIM definition may be configured, for example, in accordance with the *IEEE* 802.11*be Specification*, e.g., as described below. In other aspects, any other TIM definition may be utilized.

For example, a TIM definition, for example, in accordance with the *IEEE* 802.11*be Specification*, may define that:

An AP MLD shall assign a single AID to a non-AP MLD upon successful multi-link setup. All the STAs of the non-AP MLD shall have the same AID as the one assigned to the non-AP MLD during multi-link setup. An AP MLD shall indicate pending buffered traffic for non-AP MLDs using partial virtual bitmap of TIM element in a Beacon frame.

An AP MLD may recommend a non-AP MLD to use one or more enabled links. The AP's indication may be carried in a broadcast or a unicast frame.

In some demonstrative aspects, in some implementations, use cases, and/or scenarios, there may be a need to configure a multi-link TIM mechanism to address a technical problem to support a plurality of TID-to-link mappings, e.g., as described below.

In some demonstrative aspects, in some implementations, use cases, and/or scenarios, there may be a need to configure a multi-link TIM mechanism to address a technical problem to support the disjoint TID-to-link mapping and/or the overlapping TID-to-link mapping, e.g., as described below.

For example, there may be one or more technical problems in an implementation utilizing a TIM and a link indication. For example, a link bitmap of a non-AP MLD may indicate which link(s) should be used to retrieve Bufferable Units (BUs) at the AP MLD. Although this implementation may not directly indicate TID information of the BUs, TID(s) of BUs can be inferred from the link bitmap indirectly. However, according to this implementation full information of TIDs of BUs is not known to the non-AP MLD.

For example, there may be one or more technical problems in an implementation utilizing a Tim and a TID indication. For example, an 8-bit TID bitmap method may have higher overhead than the implementation of the link bitmap method mentioned above. For example, a 3-bit single TID bitmap method may have lower overhead than the 8-bit TID bitmap case, but may provide just single TID information. For example, the non-AP MLD cannot be able to utilize multiple links until it receives a Media Access Control (MAC) Protocol Data Unit (MPDU) that includes the full TID information from the AP MLD.

In some demonstrative aspects, device 102 and/or device 140 may be configured to implement a multilink TIM mechanism, which may be configured to combine information of the TIM, the Link bitmap, and the TID bitmap, e.g., as described below.

In some demonstrative aspects, device 102 and/or device 140 may be configured to implement a multilink TIM mechanism, which may be configured to provide a technical solution to support the AP MLD in providing to the to the non-AP MLD full information of BUs at the AP MLD, e.g., as described below.

In some demonstrative aspects, device 102 and/or device 140 may be configured to implement a multilink TIM mechanism, which may be configured to provide a technical solution to support the AP MLD in providing to the to the non-AP information of BUs at the AP MLD, for example, for a TID-link mapping case where different sets of TIDs are mapped to different links, e.g., as described below.

In some demonstrative aspects, device 102 and/or device 140 may be configured to implement a multilink TIM mechanism, which may be configured to provide a technical solution to support the AP MLD in providing to the to the non-AP information of BUs at the AP MLD, for example, in a manner which may support a technical solution to enable efficient multi-link operation, e.g., as described below.

In some demonstrative aspects, controller 124 may be configured to cause an AP MLD implemented by device 102, e.g., MLD 131, to set to "1" a bit in a Traffic Indication Map (TIM) bitmap to indicate buffered traffic for a non-AP MLD, e.g., for the non-AP MLD 131 implemented by device 102, e.g., as described below.

In some demonstrative aspects, controller 124 may be configured to cause the AP MLD implemented by device 102, e.g., MLD 131, to set a link bitmap corresponding to the non-AP MLD, e.g., as described below.

In some demonstrative aspects, the link bitmap corresponding to the non-AP MLD may include a plurality of bits corresponding to a respective plurality of links for the non-AP MLD, e.g., a described below.

In some demonstrative aspects, controller 124 may be configured to cause the AP MLD implemented by device 102, e.g., MLD 131, to set a bit in the link bitmap to "1", for example, to indicate a link for retrieving one or more buffered Bufferable Units (BUs) for the non-AP MLD, e.g., as described below.

In some demonstrative aspects, controller 124 may be configured to cause the AP MLD implemented by device 102, e.g., MLD 131, to transmit a beacon including the TIM bitmap and the link bitmap, e.g., as described below.

In some demonstrative aspects, the beacon may include a multi-link element, for example, a multi-link TIM element, which may include the link bitmap, e.g., as described below. In other aspects, the link bitmap may be included in any other element of the beacon.

In some demonstrative aspects, controller 124 may be configured to cause the AP MLD implemented by device 102, e.g., MLD 131, to set the bit in the link bitmap to "1", for example, to indicate a buffered BU having a Traffic Identifier (TID) mapped to the link indicated by the bit in the link bitmap, e.g., as described below.

In some demonstrative aspects, controller 124 may be configured to cause the AP MLD implemented by device 102, e.g., MLD 131, to set the bit in the link bitmap to "1", for example, to indicate that the link indicated by the bit in the link bitmap is recommended for retrieving the one or more buffered BUs for the non-AP MLD, e.g., as described below.

In some demonstrative aspects, controller 124 may be configured to cause the AP MLD implemented by device 102, e.g., MLD 131, to set the bit in the link bitmap to "1", for example, to indicate a buffered BU having a TID mapped to the link indicated by the bit in the link bitmap, for example, based on a determination that the non-AP MLD has negotiated a TID to link (TID-to-link) mapping, as described below.

In some demonstrative aspects, controller 124 may be configured to cause the AP MLD implemented by device 102, e.g., MLD 131, to set the bit in the link bitmap to "1", for example, to indicate that the link indicated by the bit in the link bitmap is recommended for retrieving the one or more buffered BUs for the non-AP MLD, for example, based on a determination that the non-AP MLD is at a default TID-to-link mapping, e.g., as described below.

In some demonstrative aspects, controller 124 may be configured to cause the AP MLD implemented by device 102, e.g., MLD 131, to configure the TIM bitmap comprising a plurality of bits set to "1", for example, to indicate buffered traffic for a respective plurality of non-AP MLDs, e.g., as described below.

In some demonstrative aspects, controller 124 may be configured to cause the AP MLD implemented by device 102, e.g., MLD 131, to configure the beacon including a plurality of link bitmaps corresponding to the plurality of non-AP MLDs, respectively, e.g., as described below.

In some demonstrative aspects, controller 124 may be configured to cause the AP MLD implemented by device 102, e.g., MLD 131, to arrange the plurality of link bitmaps in an ordered sequence, for example, according to an order of the plurality of non-AP MLDs indicated by the plurality of bits set to "1" in the TIM bitmap, e.g., as described below.

In some demonstrative aspects, controller 124 may be configured to cause the AP MLD implemented by device 102, e.g., MLD 131, to configure the beacon to include a plurality of link bitmaps, e.g., as described below.

In some demonstrative aspects, a count of link bitmaps in the plurality of link bitmaps may be based, for example, on a count of non-AP MLDs indicated by bits set to "1" in the TIM bitmap, e.g., as described below.

In some demonstrative aspects, controller 124 may be configured to cause the AP MLD implemented by device 102, e.g., MLD 131, to set to "1" a bit in an i-th position of the link bitmap, for example, to indicate an i-th link of the plurality of links for retrieving the one or more buffered BUs for the non-AP MLD, e.g., as described below.

In some demonstrative aspects, controller 124 may be configured to cause the AP MLD implemented by device 102, e.g., MLD 131, to set a bit in the link bitmap having a value of "0", for example, to indicate there is no buffered BU with a TID mapped to a link indicated by the bit in the link bitmap having the value of "0", e.g., as described below.

In some demonstrative aspects, controller 124 may be configured to cause the AP MLD implemented by device 102, e.g., MLD 131, to set a bit in the link bitmap having a value of "0", for example, to indicate that a link indicated by the bit in the link bitmap having the value of "0" is not recommended for retrieving the one or more buffered BUs for the non-AP MLD.

In some demonstrative aspects, controller 124 may be configured to cause the AP MLD implemented by device 102, e.g., MLD 131, to set a TID bitmap in a control field of a Media Access Control (MAC) Protocol Data Unit (MPDU) transmitted to the non-AP MLD, e.g., as described below.

In some demonstrative aspects, the TID bitmap may be configured to indicate TIDs of the one or more buffered BUs for the non-AP MLD, e.g., as described below.

In some demonstrative aspects, controller 124 may be configured to cause the AP MLD implemented by device 102, e.g., MLD 131, to set a type subfield in the control field to a predefined value, for example, to indicate that the control field includes the TID bitmap, e.g., as described below.

In some demonstrative aspects, controller 154 may be configured to cause a non-AP MLD implemented by device 140, e.g., MLD 151, to identify a bit corresponding to the non-AP MLD, e.g., MLD 151, in a TIM bitmap in a beacon from an AP MLD, e.g., in the beacon from MLD 151.

In some demonstrative aspects, the beacon may include a multi-link element, for example, a multi-link TIM element, which may include the link bitmap, e.g., as described below. In other aspects, the link bitmap may be included in any other element of the beacon.

In some demonstrative aspects, controller 154 may be configured to cause the non-AP MLD implemented by device 140, e.g., MLD 151, to access a link bitmap corresponding to the non-AP MLD, e.g., MLD 151, in the beacon, for example, based on a determination that the bit corresponding to the non-AP MLD in the TIM bitmap is set to "1", e.g., as described below.

In some demonstrative aspects, controller 154 may be configured to cause the non-AP MLD implemented by device 140, e.g., MLD 151, to identify a link for retrieving from the AP MLD one or more buffered BUs for the non-AP MLD, e.g., MLD 151, for example, based on a detection of a bit set to "1" in the link bitmap corresponding to the non-AP MLD, e.g., as described below.

In some demonstrative aspects, controller 154 may be configured to cause the non-AP MLD implemented by device 140, e.g., MLD 151, to determine that a buffered BU has a TID mapped to the link identified based on the detection of the bit set to "1" in the link bitmap corresponding to the non-AP MLD, e.g., as described below.

In some demonstrative aspects, controller 154 may be configured to cause the non-AP MLD implemented by device 140, e.g., MLD 151, to determine that the link identified based on the detection of the bit set to "1" in the link bitmap is recommended for retrieving the one or more buffered BUs for the non-AP MLD, e.g., as described below.

In some demonstrative aspects, controller 154 may be configured to cause the non-AP MLD implemented by device 140, e.g., MLD 151, to determine that a buffered BU has a TID mapped to the link identified based on the detection of the bit set to "1" in the link bitmap corresponding to the non-AP MLD, e.g., MLD 151, for example, based on a determination that the non-AP MLD, e.g., MLD 151, has negotiated a TID-to-link mapping, e.g., as described below.

In some demonstrative aspects, controller 154 may be configured to cause the non-AP MLD implemented by device 140, e.g., MLD 151, to determine that the link identified based on the detection of the bit set to "1" in the link bitmap is recommended for retrieving the one or more buffered BUs for the non-AP MLD, e.g., MLD 151, for example, based on a determination that the non-AP MLD, e.g., MLD 151, is at a default TID-to-link mapping, e.g., as described below.

In some demonstrative aspects, the TIM bitmap may include a plurality of bits set to "1", for example, to indicate buffered traffic for a respective plurality of non-AP MLDs, e.g., as described below.

In some demonstrative aspects, the beacon may include a plurality of link bitmaps corresponding to the plurality of non-AP MLDs, respectively, e.g., as described below.

In some demonstrative aspects, controller 154 may be configured to cause the non-AP MLD implemented by device 140, e.g., MLD 151, to identify a position of the link bitmap corresponding to the non-AP MLD, e.g., MLD 151, in the plurality of link bitmaps, for example, based on a position of the bit corresponding to the non-AP MLD, e.g., MLD 151, in the plurality of bits set to "1" in the TIM bitmap, e.g., as described below.

In some demonstrative aspects, controller 154 may be configured to cause the non-AP MLD implemented by device 140, e.g., MLD 151, to identify that an i-th link of the plurality of links is for retrieving the one or more buffered BUs for the non-AP MLD, e.g., MLD 151, for example, based on a detection of a bit set to "1" in an i-th position of the link bitmap, e.g., as described below.

In some demonstrative aspects, controller 154 may be configured to cause the non-AP MLD implemented by device 140, e.g., MLD 151, to determine that there is no buffered BU with a TID mapped to a link indicated by a bit in the link bitmap having the value of "0", e.g., as described below.

In some demonstrative aspects, controller 154 may be configured to cause the non-AP MLD implemented by device 140, e.g., MLD 151, to determine TIDs of the one or more buffered BUs for the non-AP MLD, e.g., MLD 151, for example, according to a TID bitmap in a control field of an MPDU from the AP MLD, e.g., as described below.

In some demonstrative aspects, controller 154 may be configured to cause the non-AP MLD implemented by device 140, e.g., MLD 151, to determine that the control field includes the TID bitmap, for example, based on a determination that a type subfield in the control field has a predefined value to indicate that the control field includes the TID bitmap, e.g., as described below.

In some demonstrative aspects, controller 124 may be configured to cause the AP MLD implemented by device 102, e.g., MLD 131, to perform one or more operations of an AP MLD according to a multi-link TIM mechanism, e.g., by implementing one or more of, e.g., some or all of, the following definitions and/or operations:

AP MLD's Behavior:

- A TIM bit that is associated with a non-AP MLD is set to 1 when there is buffered BU for the non-AP MLD.
- If there is a TID-link mapping negotiation between the AP MLD and the non-AP MLD, and the BU for the non-AP MLD belongs to TID(x), the bit position of the link bitmap that corresponds to Link(y) that is mapped to TID(x) is set to 1; otherwise the bit is set to 0.
  - The link bitmap is included in the Multi-link TIM/Bitmap element.
  - The Multi-link TIM/Bitmap element may include a set of link bitmaps for non-AP MLDs that are associated with the AP MLD that have buffered BUs at the AP MLD.
- When transmitting an MPDU to the non-AP MLD, a TID bitmap (e.g., an 8 bit bitmap or a bitmap of any other size) is included in the A-Control field in the MPDU. The TID bitmap includes the full list of TIDs of the BUs for the non-AP MLD. Bit position n of the TID bitmap is set to 1 if the BU belongs to TID(n); otherwise set to 0.

In other aspects, controller 124 may be configured to cause the AP MLD implemented by device 102, e.g., MLD 131, to perform any other additional or alternative operations of the AP MLD according to the multi-link TIM mechanism.

In some demonstrative aspects, controller 154 may be configured to cause the non-AP MLD implemented by device 140, e.g., MLD 151, to perform one or more operations of a non-AP MLD according to a multi-link TIM mechanism, e.g., by implementing one or more of, e.g., some or all of, the following definitions and/or operations:

Non-AP MLD's Behavior:

- A non-AP MLD receives a beacon and checks if the bit position of the TIM bitmap that corresponds to the non-AP MLD is set to 1.
- If the bit of the TIM bitmap is set to 1, and the non-AP MLD has negotiated TID-link mapping, the non-AP MLD checks the link bitmap field that corresponds to the non-AP MLD in the Multi-link TIM/Bitmap element.

The non-AP MLD uses the links that correspond to the bits of the link bitmap that are set to 1 to retrieve BUs from the AP MLD If the bit of the TIM bitmap is set to 1 but the non-AP MLD has not negotiated TID-link mapping and using the default mapping (all TIDs mapped to all links) then the link bitmap field that corresponds to the non-AP MLD in the Multi-link TIM/Bitmap element is used for link recommendation.

The non-AP MLD is recommended by the AP MLD to use the links that correspond to the bits of the link bitmap that are set to 1 to retrieve BUs from the AP MLD.

The non-AP MLD decodes the A-Control field of a received MPDU that contains the TID bitmap to know the full list of TIDs of the BUs buffered at the AP.

In other aspects, controller 154 may be configured to cause the non-AP MLD implemented by device 140, e.g., MLD 151, to perform any other additional or alternative operations of the non-AP MLD according to the multi-link TIM mechanism.

Figure 4:
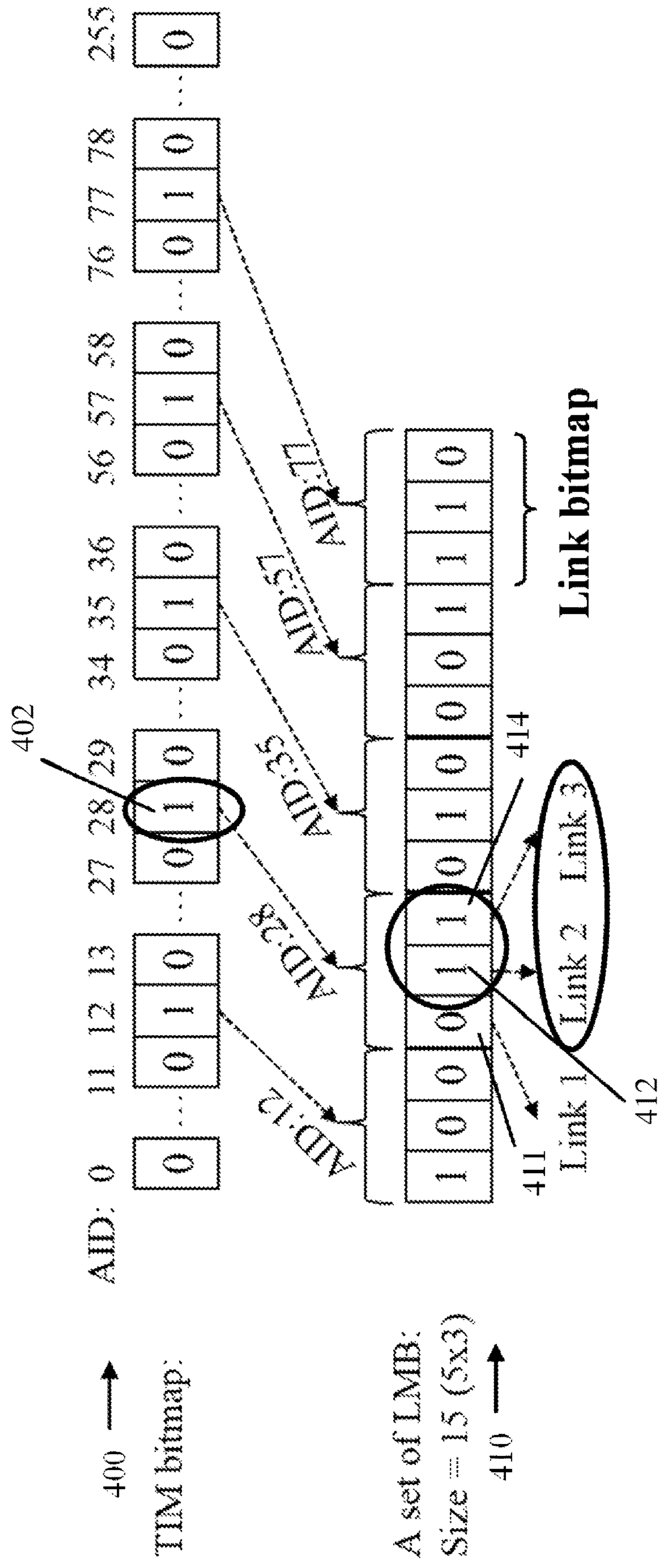
FIG. 4 is a schematic illustration of fields set in a beacon according to a Multi-Link Traffic Indication Map (TIM) mechanism, in accordance with some demonstrative aspects.

Reference is made to FIG. 4, which schematically illustrates fields set in a beacon according to a multi-link TIM mechanism, in accordance with some demonstrative aspects. For example, 124 (FIG. 1) may be configured to cause the AP MLD implemented by device 102 (FIG. 1), e.g., MLD 131 (FIG. 1), to set one or more fields in a beacon according to the fields of FIG. 4. For example, controller 154 (FIG. 1) may be configured to cause the non-AP MLD implemented by device 140 (FIG. 1), e.g., MLD 151 (FIG. 1), to identify, and/or process one or more of the fields of FIG. 4 in a received beacon.

For example, an AP MLD, e.g., MLD 131 (FIG. 1), may have buffered BUs for a non-AP MLD, e.g., MLD 151 (FIG. 1), with an Association ID (AID) equal to 28 (AID=28).

For example, a TID-link mapping for the non-AP MLD with AID=28 may include a mapping of three links, e.g., Link 1, Link 2, and Link 3, to a plurality of TIDs, e.g., TIDs 0-8.

For example, TID-link mapping for the non-AP MLD with AID=28 may include a mapping of Link 1 to the TIDs 6-7; a mapping of Link 2 to the TIDs 4-5, and 6-7; and/or a mapping of Link 3 to the TIDs 0-3, 4-5 and 6-7.

For example, the buffered BUs for the non-AP MLD, e.g., MLD 151 (FIG. 1), may correspond to a the TID 0, and the TID 4.

In some demonstrative aspects, as shown in FIG. 4, the AP MLD, e.g., MLD 131 (FIG. 1), may be configured to a beacon to include a TIM bitmap 400 and a link bitmap 410, e.g., as described below.

In some demonstrative aspects, as shown in FIG. 4, the AP MLD, e.g., MLD 131 (FIG. 1), may be configured to set to "1" a bit 402 in a TIM bitmap 400 corresponding to the AID=28, for example, to indicate that the AP MLD has buffered data, e.g., BUs, for the non-AP MLD with AID=28. The setting of the bit 402 in the TIM bitmap 400 may not indicate which link may be or should be used by the non-AP MLD.

In some demonstrative aspects, as shown in FIG. 4, the AP MLD, e.g., MLD 131 (FIG. 1), may be configured to set to "1" one or more bits in the link bitmap 410 to indicate one or more links to be used by the non-AP MLD, e.g., as described below.

In some demonstrative aspects, as shown in FIG. 4, the link bitmap 410 may be configured, e.g., as a new and/or additional element, for example, to indicate which link or links may be, e.g., should be, used to retrieved the buffered data, e.g., BUs, for the non-AP MLD. In one example, the information provided by the link bitmap 410 may not be configured to indicate the full list of TIDs of BUs for the non-AP MLD.

For example, as shown in FIG. 4, the AP MLD, e.g., MLD 131 (FIG. 1), may be configured to set bits corresponding to the non-AP MLD with AID=28 in the link bitmap 410 to indicate that the Link 2 and the Link 3 may be used, e.g., should be used, by the non-AP MLD with AID=28 to retrieve BUs from the AP MLD.

For example, as shown in FIG. 4, the AP MLD, e.g., MLD 131 (FIG. 1), may be configured to set to "1" a bit 412 in the link bitmap 410 corresponding to the Link 2, for example, to indicate that the Link 2 may be, e.g., should be, used by the non-AP MLD with AID=28 to retrieve BUs from the AP MLD.

For example, as shown in FIG. 4, the AP MLD, e.g., MLD 131 (FIG. 1), may be configured to set to "1" a bit 414 in the link bitmap 410 corresponding to the Link 3, for example, to indicate that the Link 3 may be, e.g., should be, used by the non-AP MLD with AID=28 to retrieve BUs from the AP MLD.

For example, as shown in FIG. 4, the AP MLD, e.g., MLD 131 (FIG. 1), may be configured to set to "0" a bit 411 in the link bitmap 410 corresponding to the Link 1, for example, to indicate that the Link 1 may not be, e.g., should not be, used by the non-AP MLD with AID=28 to retrieve BUs from the AP MLD.

For example, the non-AP MLD with AID=28, e.g., MLD 151 (FIG. 1), may be configured to identify based on the TIM bitmap 400 that the AP MLD, e.g., MLD 131 (FIG. 1), has BUs for the non-AP MLD with AID=28, e.g., MLD 151 (FIG. 1).

For example, the non-AP MLD with AID=28, e.g., MLD 151 (FIG. 1), may be configured to identify based on the link bitmap 410 that the Link 2 and the Link 3 may be used, e.g., should be used, by the non-AP MLD with AID=28, e.g., MLD 151 (FIG. 1), to retrieve BUs from the AP MLD.

For example, the non-AP MLD with AID=28, e.g., MLD 151 (FIG. 1), may include a single-radio MLD. According to this example, the non-AP MLD with AID=28, e.g., MLD 151 (FIG. 1), may be configured to identify based on the link bitmap 410 that the non-AP MLD with AID=28, e.g., MLD 151 (FIG. 1), may use, e.g., should use, either the Link 2 to retrieve the BUs, e.g., of TIDs 4-5; or the Link 3 to retrieve the BUs, e.g., of TIDs 0-3 or 4-5.

For example, the non-AP MLD with AID=28, e.g., MLD 151 (FIG. 1), may include a Simultaneous Transmit-Receive (STR) MLD. According to this example, the non-AP MLD with AID=28, e.g., MLD 151 (FIG. 1), may be configured to identify based on the link bitmap 410 that the non-AP MLD with AID=28, e.g., MLD 151 (FIG. 1), may use, e.g., should use, both the Link 2 to retrieve the BUs, e.g., of TIDs 4-5; and the Link 3 to retrieve the BUs, e.g., of TIDs 0-3 or 4-5.

In some demonstrative aspects, the AP MLD, e.g., MLD 131 (FIG. 1), may be configured to indicate to the non-AP MLD with AID=28, e.g., MLD 151 (FIG. 1), a list of TIDs, e.g., a full list of TIDs, which are buffered at the AP MLD for the –AP MLD with AID=28.

In some demonstrative aspects, the AP MLD, e.g., MLD 131 (FIG. 1), may be configured to include a TID bitmap in one or more MPDUs transmitted to the non-AP MLD with AID=28.

In some demonstrative aspects, the TID bitmap may be included in an A-Control field of the one or more MPDUs, e.g., as described below. In other aspects, the TID bitmap may be included in any other additional or alternative field.

In some demonstrative aspects, the TID bitmap may include an 8-bit bitmap in an 8-bit field. In other aspects, the bitmap may have any other size.

In some demonstrative aspects, the AP MLD, e.g., MLD 131 (FIG. 1), may be configured to set the TID bitmap, which is included in the one or more MPDUs transmitted to the non-AP MLD with AID=28, for example, to indicate a list of TIDs, e.g., a full list of TIDs, which are buffered at the AP MLD for the –AP MLD with AID=28.

For example, the AP MLD, e.g., MLD 131 (FIG. 1), may be configured to set the A-Control field in the one or more MPDUs transmitted to the non-AP MLD with AID=28 to include a TID bitmap, e.g., an 8-bit field, including a list of TIDs, e.g., a full list of TIDs, which are buffered at the AP MLD for the –AP MLD with AID=28.

For example, the non-AP MLD with AID=28, e.g., MLD 151 (FIG. 1), may be configured to identify based on the TID bitmap in the A-Control field of one or more received MPDUs the list, e.g., the full list of TIDs of BUs for the –AP MLD with AID=28.

For example, the TID bitmap in the A-Control field of one or more received MPDUs may list the TIDs 0 and 4.

Referring back to FIG. 1, in some demonstrative aspects, devices 102 and/or device 140 may be configured to generate, transmit, receive, and/or process, one or more transmissions including a field, e.g., an "A-control field", which may be configured for multi-link operation, e.g., as described below.

In some demonstrative aspects, controller 124 may be configured to cause the AP MLD implemented by device 102, e.g., MLD 131, to set a TID bitmap in a control field, e.g., an A-Control field or any other control field, of an MPDU to be transmitted to a non-AP MLD, e.g., MLD 151, for example, to indicate TIDs of one or more buffered BUs for an non-AP MLD.

In some demonstrative aspects, controller 154 may be configured to cause the non-AP MLD implemented by device 140, e.g., MLD 151, to process MPDUs from an AP MLD, e.g., ML 131 FIG. 1, and to determine TIDs of buffered BUs for the non-AP MLD, for example, according to the TID bitmap in the control field of the MPDUs from the AP MLD.

Figure 5:
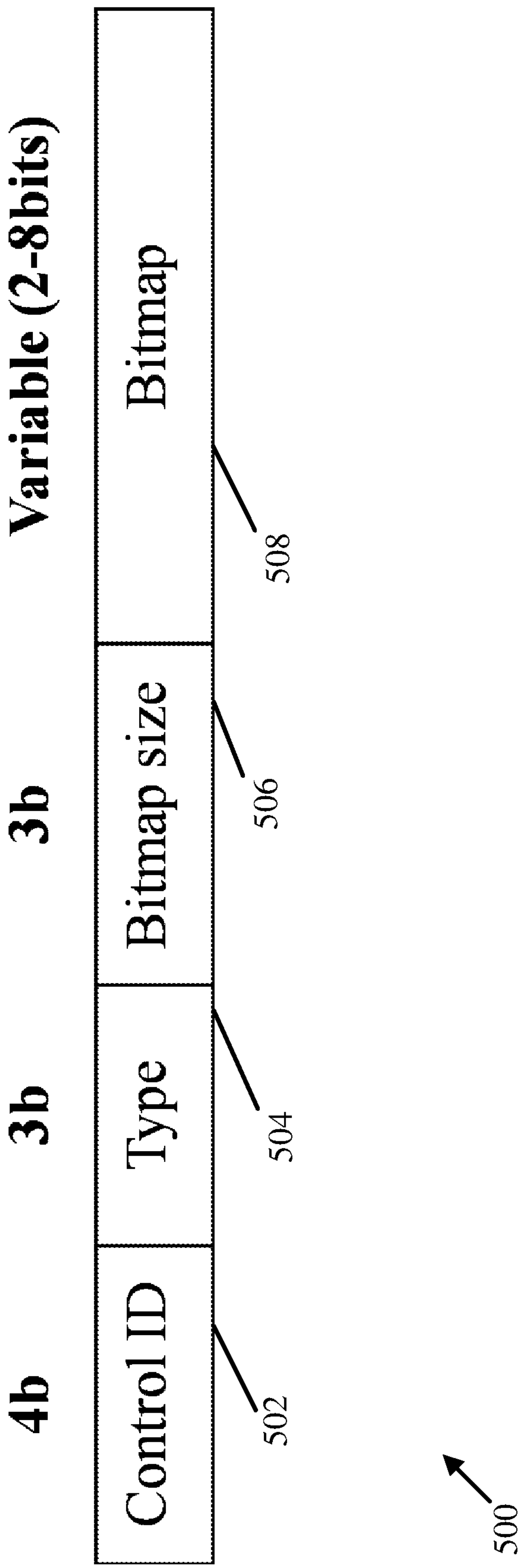
FIG. 5 is an illustration of a unified A-Control field format, in accordance with some demonstrative aspects.

Reference is made to FIG. 5, which schematically illustrates a unified A-Control field format 500, in accordance with some demonstrative aspects. For example, controller 124 may be configured to cause the AP MLD implemented by device 102, e.g., MLD 131, to set, generate and/or transmit the A-Control field 500, e.g., as per of one or more frames. For example, controller 154 may be configured to cause the MLD implemented by device 140, e.g., MLD 151, to receive, process and/or interpret the A-Control field 500, e.g., in one or more received frames.

In some demonstrative aspects, as shown in FIG. 5, A-Control field may include a Control ID subfield 502, e.g., including 4 bits or any other bit size. For example, the Control ID subfield 502 may be set to a predefined value to indicate an MLO bitmap.

In some demonstrative aspects, as shown in FIG. 5, A-Control field may include a type subfield 504, e.g., including 3 bits or any other bit size.

In some demonstrative aspects, type subfield 504 may be set to a first value, e.g., "0", for example, to indicate a TID control frame type. For example, the TID control frame type may be utilized by an AP MLD to indicate a list of TIDs of BUs buffered at the AP MLD, e.g., as described above.

In some demonstrative aspects, type subfield 504 may be set to a second value, e.g., "1", for example, to indicate a Link recommendation control frame type. For example, the Link recommendation frame type may be utilized by an AP MLD to recommend links for data exchange.

In some demonstrative aspects, type subfield 504 may be set to a third value, e.g., "2", for example, to indicate a Power management mode/power state indication frame type. For example, the Power management mode/power state indication frame type may be utilized by a non-AP MLD to indicate a power management mode/power state of other links.

In some demonstrative aspects, type subfield 504 may be set to a fourth value, e.g., "3", for example, to indicate a Request for a frame transmission frame type. For example, the Request for a frame transmission frame type may be utilized by a non-AP MLD to indicate to an AP MLD to transmit a frame on other links.

In some demonstrative aspects, one or more values of the type subfield 504, e.g., the values 4-7, may be reserved.

In some demonstrative aspects, as shown in FIG. 5, A-Control field may include a bitmap size subfield 506, e.g., including 3 bits or any other bit size.

In some demonstrative aspects, one or more values of the bitmap size subfield 506, e.g., values 0-6, may be configured to indicate a size of 2-8 bits, or any other size.

In some demonstrative aspects, one or more values of the bitmap size subfield 506, e.g., the value 7, may be reserved.

In some demonstrative aspects, as shown in FIG. 5, A-Control field may include a bitmap subfield 508, e.g., including a variable number of bits, e.g., between 2-8 bits or any other bit size. For example, the value of the bitmap size subfield 506 may be set according to the size of the bitmap subfield 508.

In some demonstrative aspects, the encoding and/or contents of the bitmap subfield 508 may depend on the type subfield 504.

For example, bitmap subfield 508 may be encoded by an AP MLD to indicate a list of TIDs of BUs buffered at the AP MLD, for example, when the type subfield 504 is set to "0".

Figure 6:
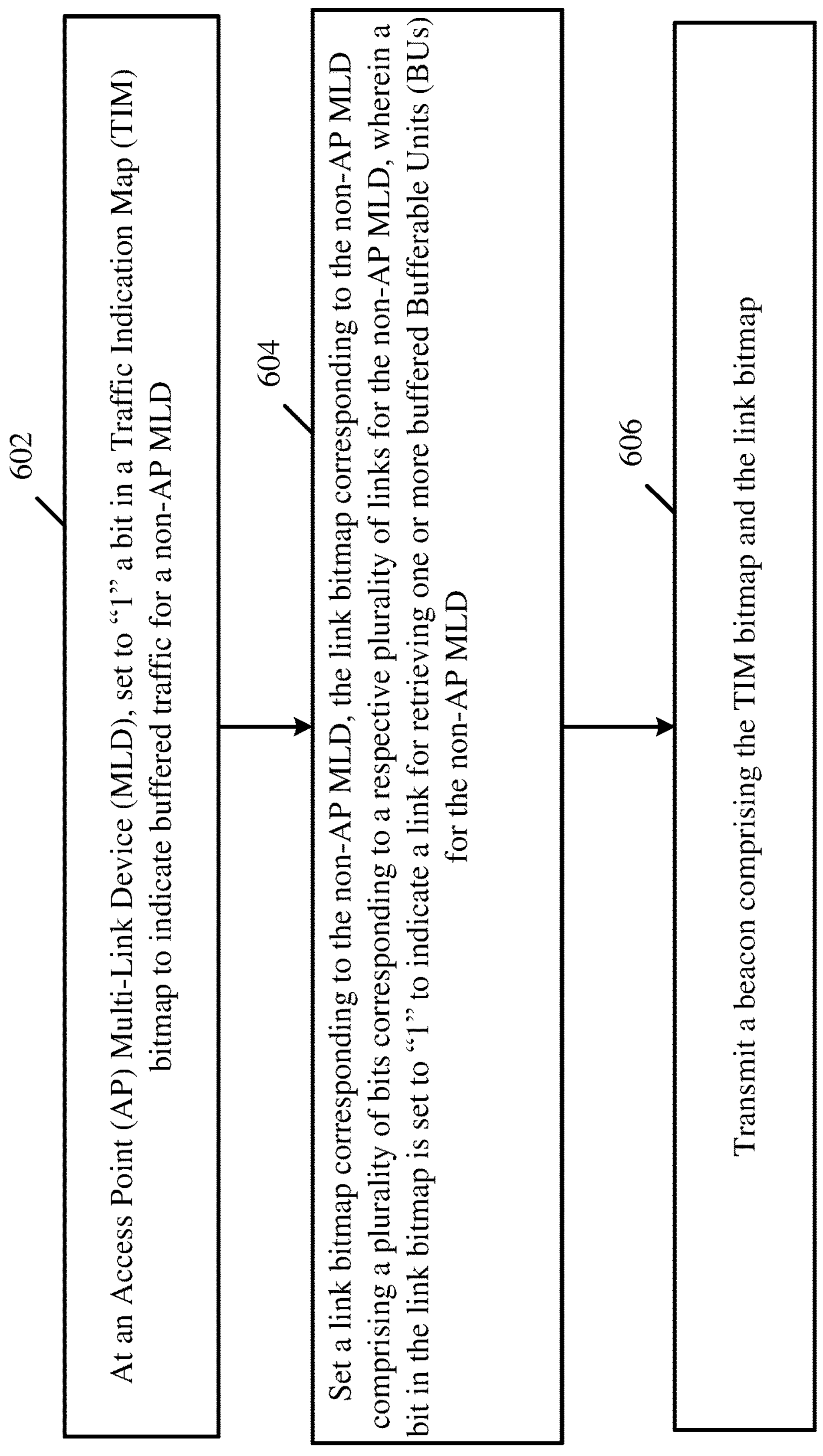
FIG. 6 is a schematic flow-chart illustration of a method of wireless communication utilizing a multilink TIM, in accordance with some demonstrative aspects.

Reference is made to FIG. 6, which schematically illustrates a method wireless communication utilizing a multilink TIM, in accordance with some demonstrative aspects. For example, one or more of the operations of the method of FIG. 6 may be performed by one or more elements of a system, e.g., system 100 (FIG. 1), for example, one or more wireless devices, e.g., device 102 (FIG. 1), and/or device 140 (FIG. 1), an MLD, e.g., MLD 131 (FIG. 1) and/or MLD 151 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 602, the method may include setting to "1", at an AP MLD, a bit in a Traffic Indication Map (TIM) bitmap to indicate buffered traffic for a non-AP MLD. For example, controller 124 (FIG. 1) may be configured to cause, trigger, and/or control AP MLD 131 (FIG. 1) to set to "1" a bit in a TIM bitmap to indicate buffered traffic for non-AP MLD 151 (FIG. 1), e.g., as described above.

As indicated at block 604, the method may include setting at the AP MLD a link bitmap corresponding to the non-AP MLD, the link bitmap corresponding to the non-AP MLD including a plurality of bits corresponding to a respective plurality of links for the non-AP MLD, wherein a bit in the link bitmap is set to "1" to indicate a link for retrieving one or more buffered Bufferable Units (BUs) for the non-AP MLD. For example, controller 124 (FIG. 1) may be configured to cause, trigger, and/or control AP MLD 131 (FIG. 1)

to set a link bitmap corresponding to the non-AP MLD 151 (FIG. 1), for example, by setting the link bitmap corresponding to the non-AP MLD 151 (FIG. 1) to include a plurality of bits corresponding to a respective plurality of links for the non-AP MLD 151 (FIG. 1), for example, such that a bit in the link bitmap is set to "1" to indicate a link for retrieving one or more buffered BUs for the non-AP MLD 151 (FIG. 1), e.g., as described above.

As indicated at block 606, the method may include transmitting from the AP MLD a beacon including the TIM bitmap and the link bitmap. For example, controller 124 (FIG. 1) may be configured to cause, trigger, and/or control AP MLD 131 (FIG. 1) to transmit a beacon including the TIM bitmap and the link bitmap, e.g., as described above.

Figure 7:
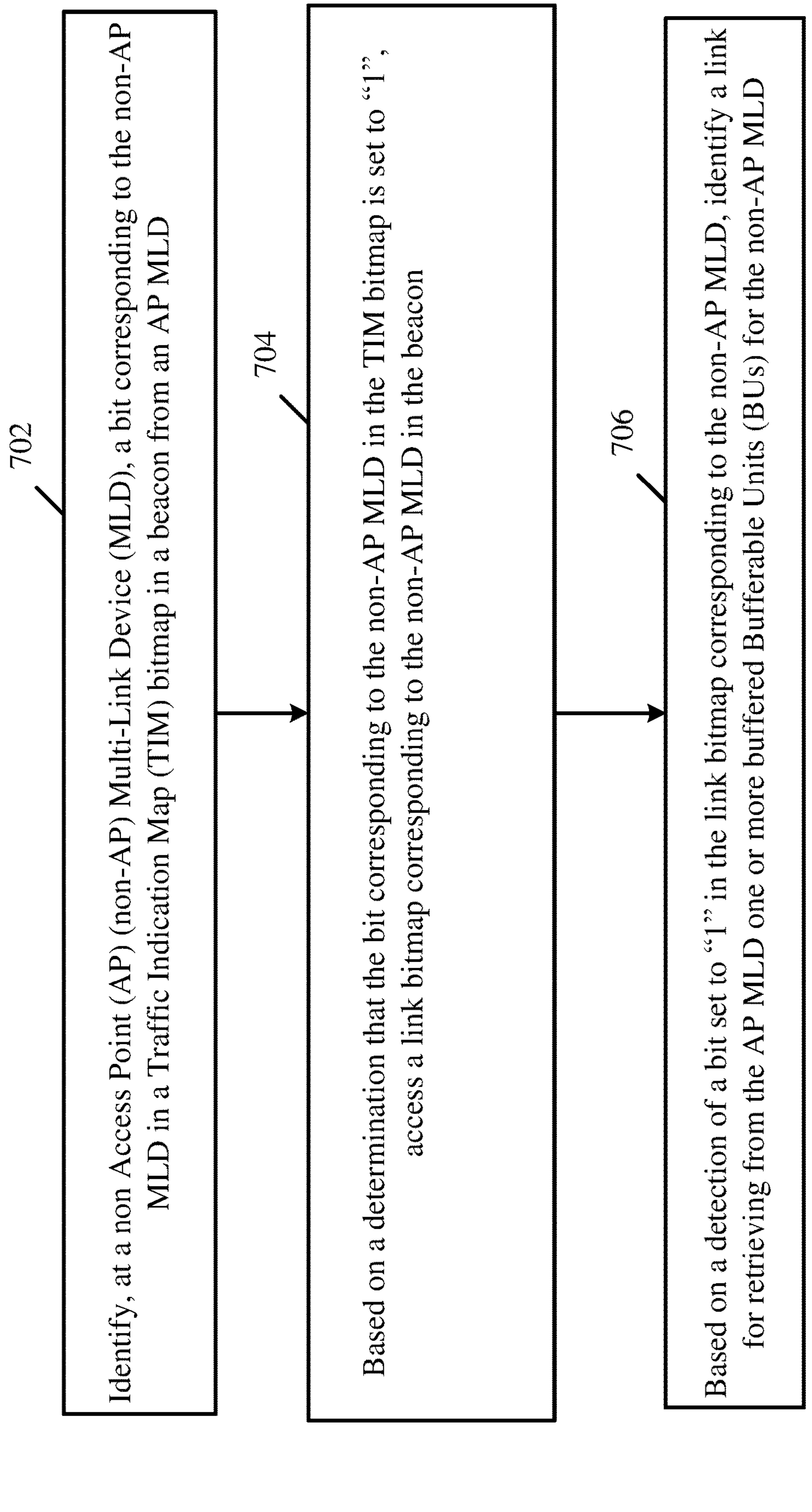
FIG. 7 is a schematic flow-chart illustration of a method of wireless communication utilizing a multilink TIM, in accordance with some demonstrative aspects.

Reference is made to FIG. 7, which schematically illustrates a method wireless communication utilizing a multilink TIM, in accordance with some demonstrative aspects. For example, one or more of the operations of the method of FIG. 7 may be performed by one or more elements of a system, e.g., system 100 (FIG. 1), for example, one or more wireless devices, e.g., device 102 (FIG. 1), and/or device 140 (FIG. 1), an MLD, e.g., MLD 131 (FIG. 1) and/or MLD 151 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 702, the method may include identifying, at a non-AP MLD, a bit corresponding to the non-AP MLD in a TIM bitmap in a beacon from an AP MLD. For example, controller 154 (FIG. 1) may be configured to cause, trigger, and/or control MLD 151 (FIG. 1) to identify a bit corresponding to the non-AP MLD 151 (FIG. 1) in a TIM bitmap in a beacon from AP MLD 131 (FIG. 1), e.g., as described above.

As indicated at block 704, the method may include accessing a link bitmap corresponding to the non-AP MLD in the beacon, for example, based on a determination that the bit corresponding to the non-AP MLD in the TIM bitmap is set to "1". For example, controller 154 (FIG. 1) may be configured to cause, trigger, and/or control MLD 151 (FIG. 1) to access a link bitmap corresponding to the MLD 151 (FIG. 1) in the beacon, for example, based on a determination that the bit corresponding to the MLD 151 (FIG. 1) in the TIM bitmap is set to "1", e.g., as described above.

As indicated at block 706, the method may include identifying a link for retrieving from the AP MLD one or more buffered BUs for the non-AP MLD, for example, based on a detection of a bit set to "1" in the link bitmap corresponding to the non-AP MLD. For example, controller 154 (FIG. 1) may be configured to cause, trigger, and/or control MLD 151 (FIG. 1) to identify a link for retrieving from the AP MLD 131 (FIG. 1) one or more buffered BUs for the MLD 151 (FIG. 1), for example, based on a detection of a bit set to "1" in the link bitmap corresponding to the MLD 151 (FIG. 1), e.g., as described above.

Figure 8:
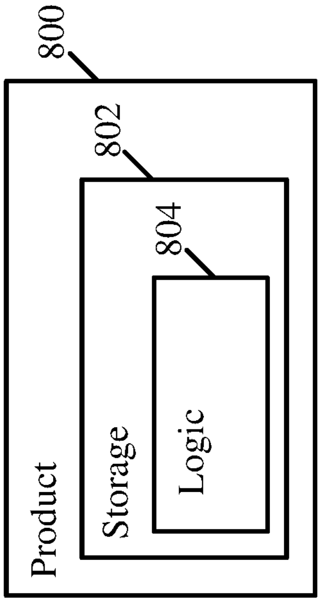
FIG. 8 is a schematic illustration of a product of manufacture, in accordance with some demonstrative aspects.

Reference is made to FIG. 8, which schematically illustrates a product of manufacture 800, in accordance with some demonstrative aspects. Product 800 may include one or more tangible computer-readable ("machine-readable") non-transitory storage media 802, which may include computer-executable instructions, e.g., implemented by logic 804, operable to, when executed by at least one computer processor, enable the at least one computer processor to implement one or more operations at device 102 (FIG. 1), device 140 (FIG. 1), MLD 131 (FIG. 1), MLD 151 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1), to cause device 102 (FIG. 1), device 140 (FIG. 1), MLD 131 (FIG. 1), MLD 151 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1), to perform, trigger and/or implement one or more operations and/or functionalities, and/or to perform, trigger and/or implement one or more operations and/or functionalities described with reference to the FIGS. 1, 2, 3, 4, 5, 6, and/or 7, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 800 and/or machine readable storage media 802 may include one or more types of computer-readable storage media capable of storing data, including volatile memory, non-volatile memory, removable or non-removable memory, erasable or non-erasable memory, writeable or re-writeable memory, and the like. For example, machine readable storage media 802 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EE-PROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 804 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 804 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further aspects.

Example 1 includes an apparatus comprising logic and circuitry configured to cause an Access Point (AP) Multi-Link Device (MLD) to set to "1" a bit in a Traffic Indication Map (TIM) bitmap to indicate buffered traffic for a non-AP MLD; set a link bitmap corresponding to the non-AP MLD, the link bitmap corresponding to the non-AP MLD comprising a plurality of bits corresponding to a respective plurality of links for the non-AP MLD, wherein a bit in the link bitmap is set to "1" to indicate a link for retrieving one or more buffered Bufferable Units (BUs) for the non-AP MLD; and transmit a beacon comprising the TIM bitmap and the link bitmap.

Example 2 includes the subject matter of Example 1, and optionally, wherein the apparatus is configured to cause the AP MLD to set the bit in the link bitmap to "1" to indicate a buffered BU having a Traffic Identifier (TID) mapped to the link indicated by the bit in the link bitmap.

Example 3 includes the subject matter of Example 1, and optionally, wherein the apparatus is configured to cause the AP MLD to set the bit in the link bitmap to "1" to indicate that the link indicated by the bit in the link bitmap is recommended for retrieving the one or more buffered BUs for the non-AP MLD.

Example 4 includes the subject matter of Example 1, and optionally, wherein the apparatus is configured to cause the AP MLD to, based on a determination that the non-AP MLD has negotiated a Traffic Identifier (TID) to link (TID-to-link) mapping, set the bit in the link bitmap to "1" to indicate a buffered BU having a TID mapped to the link indicated by the bit in the link bitmap.

Example 5 includes the subject matter of Example 1, and optionally, wherein the apparatus is configured to cause the AP MLD to, based on a determination that the non-AP MLD is at a default Traffic Identifier (TID) to link (TID-to-link) mapping, set the bit in the link bitmap to "1" to indicate that the link indicated by the bit in the link bitmap is recommended for retrieving the one or more buffered BUs for the non-AP MLD.

Example 6 includes the subject matter of any one of Examples 1-5, and optionally, wherein the apparatus is configured to cause the AP MLD to configure the TIM bitmap comprising a plurality of bits set to "1" to indicate buffered traffic for a respective plurality of non-AP MLDs, and to configure the beacon comprising a plurality of link bitmaps corresponding to the plurality of non-AP MLDs, respectively.

Example 7 includes the subject matter of Example 6, and optionally, wherein the apparatus is configured to cause the AP MLD to arrange the plurality of link bitmaps in an ordered sequence according to an order of the plurality of non-AP MLDs indicated by the plurality of bits set to "1" in the TIM bitmap.

Example 8 includes the subject matter of any one of Examples 1-7, and optionally, wherein the apparatus is configured to cause the AP MLD to configure the beacon to include a plurality of link bitmaps, a count of link bitmaps in the plurality of link bitmaps is based on a count of non-AP MLDs indicated by bits set to "1" in the TIM bitmap.

Example 9 includes the subject matter of any one of Examples 1-8, and optionally, wherein the apparatus is configured to cause the AP MLD to set to "1" a bit in an i-th position of the link bitmap to indicate an i-th link of the plurality of links for retrieving the one or more buffered BUs for the non-AP MLD.

Example 10 includes the subject matter of any one of Examples 1-9, and optionally, wherein a bit in the link bitmap having a value of "0" is to indicate there is no buffered BU with a Traffic Identifier (TID) mapped to a link indicated by the bit in the link bitmap having the value of "0".

Example 11 includes the subject matter of any one of Examples 1-10, and optionally, wherein a bit in the link bitmap having a value of "0" is to indicate that a link indicated by the bit in the link bitmap having the value of "0" is not recommended for retrieving the one or more buffered BUs for the non-AP MLD.

Example 12 includes the subject matter of any one of Examples 1-11, and optionally, wherein the apparatus is configured to cause the AP MLD to set a Traffic Identifier (TID) bitmap in a control field of a Media Access Control (MAC) Protocol Data Unit (MPDU) transmitted to the non-AP MLD, the TID bitmap to indicate TIDs of the one or more buffered BUs for the non-AP MLD.

Example 13 includes the subject matter of Example 12, and optionally, wherein the apparatus is configured to cause the AP MLD to set a type subfield in the control field to a predefined value to indicate that the control field includes the TID bitmap.

Example 14 includes the subject matter of any one of Examples 1-13, and optionally, wherein the beacon comprises a multi-link TIM element, the multi-link TIM element comprising the link bitmap.

Example 15 includes the subject matter of any one of Examples 1-14, and optionally, comprising a radio to transmit the beacon.

Example 16 includes the subject matter of Example 15, and optionally, comprising one or more antennas connected to the radio, and a processor to execute instructions of an operating system of the AP MLD.

Example 17 includes an apparatus comprising logic and circuitry configured to cause a non Access Point (AP) (non-AP) Multi-Link Device (MLD) to identify a bit corresponding to the non-AP MLD in a Traffic Indication Map (TIM) bitmap in a beacon from an AP MLD; based on a determination that the bit corresponding to the non-AP MLD in the TIM bitmap is set to "1", access a link bitmap corresponding to the non-AP MLD in the beacon; and based on a detection of a bit set to "1" in the link bitmap corresponding to the non-AP MLD, identify a link for retrieving from the AP MLD one or more buffered Bufferable Units (BUs) for the non-AP MLD.

Example 18 includes the subject matter of Example 17, and optionally, wherein the apparatus is configured to cause the non-AP MLD to determine that a buffered BU has a Traffic Identifier (TID) mapped to the link identified based on detection of the bit set to "1" in the link bitmap corresponding to the non-AP MLD.

Example 19 includes the subject matter of Example 17, and optionally, wherein the apparatus is configured to cause the non-AP MLD to determine that the link identified based on the detection of the bit set to "1" in the link bitmap is recommended for retrieving the one or more buffered BUs for the non-AP MLD.

Example 20 includes the subject matter of Example 17, and optionally, wherein the apparatus is configured to cause the non-AP MLD to, based on a determination that the non-AP MLD has negotiated a Traffic Identifier (TID) to link (TID-to-link) mapping, determine that a buffered BU has a TID mapped to the link identified based on the detection of the bit set to "1" in the link bitmap corresponding to the non-AP MLD.

Example 21 includes the subject matter of Example 17, and optionally, wherein the apparatus is configured to cause the non-AP MLD to, based on a determination that the non-AP MLD is at a default Traffic Identifier (TID) to link (TID-to-link) mapping, determine that the link identified based on the detection of the bit set to "1" in the link bitmap is recommended for retrieving the one or more buffered BUs for the non-AP MLD.

Example 22 includes the subject matter of any one of Examples 17-21, and optionally, wherein the TIM bitmap comprises a plurality of bits set to "1" to indicate buffered traffic for a respective plurality of non-AP MLDs, and wherein the beacon comprises a plurality of link bitmaps corresponding to the plurality of non-AP MLDs, respectively.

Example 23 includes the subject matter of Example 22, and optionally, wherein the apparatus is configured to cause the non-AP MLD to identify a position of the link bitmap corresponding to the non-AP MLD in the plurality of link bitmaps based on a position of the bit corresponding to the non-AP MLD in the plurality of bits set to "1" in the TIM bitmap.

Example 24 includes the subject matter of any one of Examples 17-23, and optionally, wherein the apparatus is configured to cause the non-AP MLD to, based on a detection of a bit set to "1" in an i-th position of the link bitmap, identify that an i-th link of the plurality of links is for retrieving the one or more buffered BUs for the non-AP MLD.

Example 25 includes the subject matter of any one of Examples 17-24, and optionally, wherein the apparatus is configured to cause the non-AP MLD to determine that there is no buffered BU with a Traffic Identifier (TID) mapped to a link indicated by a bit in the link bitmap having the value of "0".

Example 26 includes the subject matter of any one of Examples 17-23, and optionally, wherein the apparatus is configured to cause the non-AP MLD to determine Traffic Identifiers (TIDs) of the one or more buffered BUs for the non-AP MLD according to a TID bitmap in a control field of a Media Access Control (MAC) Protocol Data Unit (MPDU) from the AP MLD.

Example 27 includes the subject matter of Example 26, and optionally, wherein the apparatus is configured to cause the non-AP MLD to determine that the control field includes the TID bitmap based on a determination that a type subfield in the control field has a predefined value to indicate that the control field includes the TID bitmap.

Example 28 includes the subject matter of any one of Examples 17-27, and optionally, wherein the beacon comprises a multi-link TIM element, the multi-link TIM element comprising the link bitmap.

Example 29 includes the subject matter of any one of Examples 17-28, and optionally, comprising a radio to receive the beacon.

Example 30 includes the subject matter of Example 29, and optionally, comprising one or more antennas connected to the radio, and a processor to execute instructions of an operating system of the non-AP MLD.

Example 31 comprises an apparatus comprising means for executing any of the described operations of Examples 1-30.

Example 32 comprises a product comprising one or more tangible computer-readable non-transitory storage media comprising computer-executable instructions operable to, when executed by at least one processor, enable the at least one processor to cause a computing device to perform any of the described operations of Examples 1-30.

Example 33 comprises an apparatus comprising: a memory interface; and processing circuitry configured to: perform any of the described operations of Examples 1-30.

Example 34 comprises a method comprising any of the described operations of Examples 1-30.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:

a processor configured to cause an Access Point (AP) Multi-Link Device (MLD) to:

set to "1" a bit in a Traffic Indication Map (TIM) bitmap to indicate buffered traffic for a non-AP MLD;

set a link bitmap corresponding to the non-AP MLD, the link bitmap corresponding to the non-AP MLD comprising a plurality of bits corresponding to a respective plurality of links for the non-AP MLD, wherein a bit in the link bitmap is set to "1" to indicate a link corresponding to the bit for retrieving one or more buffered Bufferable Units (BUs) for the non-AP MLD, wherein the processor is configured to cause the AP MLD to set the bit in the link bitmap to "1" to provide a first indication in case of making a first determination and to provide a second indication in case of making a second determination, wherein the first determination comprises a determination that the non-AP MLD has negotiated a Traffic Identifier (TID) to link (TID-to-link) mapping, and the first indication is to indicate to the non-AP MLD that the one or more buffered BUs have a TID mapped to the link corresponding to the bit in the link bitmap, wherein the second determination comprises a determination that the non-AP MLD is at a default TID-to-link mapping, and the second indication is to indicate to the non-AP MLD that the link corresponding to the bit in the link bitmap is recommended for retrieving the one or more buffered BUs for the non-AP MLD; and transmit a beacon comprising the TIM bitmap and the link bitmap; and a memory to store information processed by the processor.

2. The apparatus of claim 1 configured to cause the AP MLD to configure the TIM bitmap comprising a plurality of bits set to "1" to indicate buffered traffic for a respective plurality of non-AP MLDs, and to configure the beacon comprising a plurality of link bitmaps corresponding to the plurality of non-AP MLDs, respectively.

3. The apparatus of claim 2 configured to cause the AP MLD to arrange the plurality of link bitmaps in an ordered sequence according to an order of the plurality of non-AP MLDs indicated by the plurality of bits set to "1" in the TIM bitmap.

4. The apparatus of claim 1 configured to cause the AP MLD to configure the beacon to include a plurality of link bitmaps, a count of link bitmaps in the plurality of link bitmaps is based on a count of non-AP MLDs indicated by bits set to "1" in the TIM bitmap.

5. The apparatus of claim 1 configured to cause the AP MLD to set to "1" a bit in ani-th position of the link bitmap to indicate an i-th link for the one or more buffered BUs for the non-AP MLD.

6. The apparatus of claim 1, wherein a bit in the link bitmap having a value of "0" is to indicate there is no buffered BU with a Traffic Identifier (TID) mapped to a link corresponding to the bit in the link bitmap having the value of "0".

7. The apparatus of claim 1, wherein a bit in the link bitmap having a value of "0" is to indicate that a link corresponding to the bit in the link bitmap having the value of "0" is not recommended for retrieving the one or more buffered BUs for the non-AP MLD.

8. The apparatus of claim 1, wherein the beacon comprises a multi-link traffic element, the multi-link traffic element comprising the link bitmap.

9. The apparatus of claim 1 comprising a radio to transmit the beacon.

10. The apparatus of claim 9 comprising one or more antennas connected to the radio, and another processor to execute instructions of an operating system of the AP MLD.

11. A product comprising one or more tangible computer-readable non-transitory storage media comprising instructions operable to, when executed by at least one processor, enable the at least one processor to cause an Access Point (AP) Multi-Link Device (MLD) to:

set to "1" a bit in a Traffic Indication Map (TIM) bitmap to indicate buffered traffic for a non-AP MLD;

set a link bitmap corresponding to the non-APMLD, the link bitmap corresponding to the non-AP MLD comprising a plurality of bits corresponding to a respective plurality of links for the non-AP MLD, wherein a bit in the link bitmap is set to "1" to indicate a link corresponding to the bit for retrieving one or more buffered Bufferable Units (BUs) for the non-AP MLD, wherein the instructions, when executed, cause the AP MLD to set the bit in the link bitmap to "1" to provide a first indication in case of making a first determination and to provide a second indication in case of making a second determination, wherein the first determination comprises a determination that the non-AP MLD has negotiated a Traffic Identifier (TID) to link (TID-to-link) mapping, and the first indication is to indicate to the non-AP MLD that the one or more buffered BUs have a TID mapped to the link corresponding to the bit in the link bitmap, wherein the second determination comprises a determination that the non-AP MLD is at a default TID-to-link mapping, and the second indication is to indicate to the non-AP MLD that the link corresponding to the bit in the link bitmap is recommended for retrieving the one or more buffered BUs for the non-AP MLD; and transmit a beacon comprising the TIM bitmap and the link bitmap.

12. The product of claim 11, wherein a bit in the link bitmap having a value of "0" is to indicate there is no buffered BU with a Traffic Identifier (TID) mapped to a link corresponding to the bit in the link bitmap having the value of "0".

13. The product of claim 11, wherein a bit in the link bitmap having a value of "0" is to indicate that a link corresponding to the bit in the link bitmap having the value of "0" is not recommended for retrieving the one or more buffered BUs for the non-AP MLD.

14. The product of claim 11, wherein the instructions, when executed, cause the AP MLD to configure the TIM-bitmap comprising a plurality of bits set to "1" to indicate buffered trafficfor a respective plurality of non-AP MLDs, and to configure the beacon comprising a plurality of link bitmaps corresponding to the plurality of non-AP MLDs, respectively.

15. An apparatus for an Access Point (AP) Multi-Link Device (MLD), the apparatus comprising:

means for setting to "1" a bit in a Traffic Indication Map (TIM) bitmap to indicate buffered traffic for a non-AP MLD;

means for setting a link bitmap corresponding to the non-AP MLD, the link bitmap corresponding to the non-AP MLD comprising a plurality of bits corresponding to a respective plurality of links for the non-AP MLD, wherein a bit in the link bitmap is set to "1" to indicate a link corresponding to the bit for retrieving one or more buffered Bufferable Units (BUs) for the non-AP MLD, wherein the means for setting the link bitmap corresponding to the non-AP MLD is configured to set the bit in the link bitmap to "1" to provide a first indication in case of making a first determination and to provide a second indication in case of making a second determination, wherein the first determination comprises a determination that the non-AP MLD has negotiated a Traffic Identifier (TID) to link (TID-to-link) mapping and the first indication is to indicate to the non-AP MLD that the one or more buffered BUs have a TID mapped to the link corresponding to the bit in the link bitmap, wherein the second determination comprises a determination that the non-AP MLD is at a default TID-to-link mapping, and the second indication is to indicate to the non-AP MLD that the link corresponding to the bit in the link bitmap is recommended for retrieving the one or more buffered BUs for the non-AP MLD; and means for causing the AP MLD to transmit a beacon comprising the TIM bitmap and the link bitmap.

16. The apparatus of claim 15 comprising means for configuring the TIM bitmap comprising a plurality of bits set to "1" to indicate buffered traffic for a respective plurality of non-AP MLDs, and to configure the beacon comprising a plurality of link bitmaps corresponding to the plurality of non-AP MLDs, respectively.

* * * * *